United States Patent
Brzezinski

(10) Patent No.: US 9,657,780 B2
(45) Date of Patent: May 23, 2017

(54) AXIAL NEEDLE ROLLER BEARING WITH SELF-ALIGNING WASHERS

(71) Applicant: Schaeffler Technologies AG & Co. KG, Herzogenaurach (DE)

(72) Inventor: Clayton Brzezinski, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/676,924

(22) Filed: Apr. 2, 2015

(65) Prior Publication Data
US 2016/0290392 A1   Oct. 6, 2016

(51) Int. Cl.
| | | |
|---|---|---|
| *F16C 19/10* | (2006.01) | |
| *F16C 35/077* | (2006.01) | |
| *F16C 23/08* | (2006.01) | |
| *F16C 27/08* | (2006.01) | |
| *F16C 19/30* | (2006.01) | |
| *F16C 19/46* | (2006.01) | |

(52) U.S. Cl.
CPC ............ *F16C 35/077* (2013.01); *F16C 23/08* (2013.01); *F16C 27/08* (2013.01); *F16C 19/305* (2013.01); *F16C 19/463* (2013.01); *F16C 2220/82* (2013.01)

(58) Field of Classification Search
CPC ........ F16C 19/30; F16C 19/305; F16C 19/44; F16C 19/46; F16C 19/463; F16C 19/466; F16C 19/48; F16C 23/082; F16C 23/086; F16C 23/08; F16C 27/08
See application file for complete search history.

(56) References Cited

U.S. PATENT DOCUMENTS

| | | | | |
|---|---|---|---|---|
| 3,341,263 A | * | 9/1967 | Pitner | F16C 19/48 384/455 |
| 3,829,181 A | * | 8/1974 | Gunther | F16C 19/30 384/455 |
| 5,918,987 A | | 7/1999 | Sundquist et al. | |
| 5,975,763 A | | 11/1999 | Shattuck et al. | |

FOREIGN PATENT DOCUMENTS

JP   3628033   * 12/2004

OTHER PUBLICATIONS

Translation of JP3628033 (JPH07119740) obtained Apr. 20, 2016.*

* cited by examiner

*Primary Examiner* — James Pilkington
(74) *Attorney, Agent, or Firm* — Volpe and Koenig, P.C.

(57) ABSTRACT

An axial needle roller bearing assembly is provided having first and second axial end washers, each with a radial body having a concave outer profile and a convex inner profile in radial cross-section and each including an axial flange on one of a radially inner or outer side. First and second intermediate washers having respective intermediate radial bodies with first and second axial sides are provided with the first axial sides defining first and second bearing races and the second axial sides defining contact surfaces for the respective first and second axial end washers. A cage and roller assembly is located between the first and second bearing races, and includes a cage with a plurality of radially extending needle roller pockets, and a plurality of needle rollers received in at least some of the pockets.

8 Claims, 1 Drawing Sheet

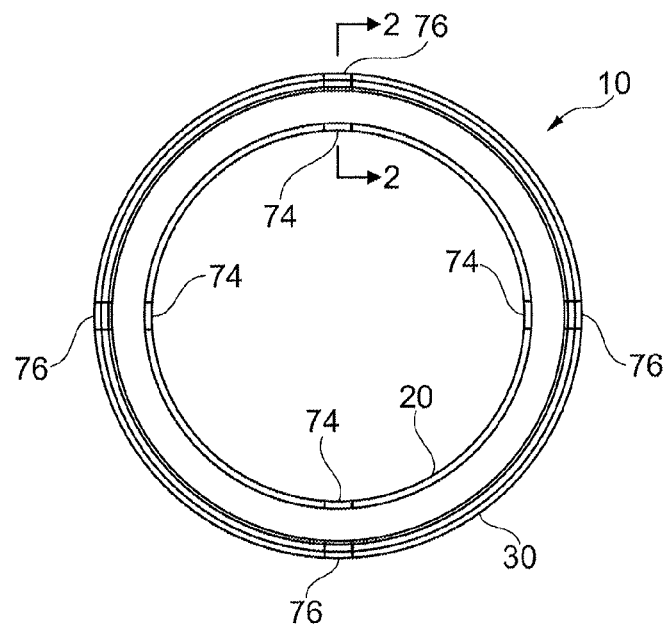
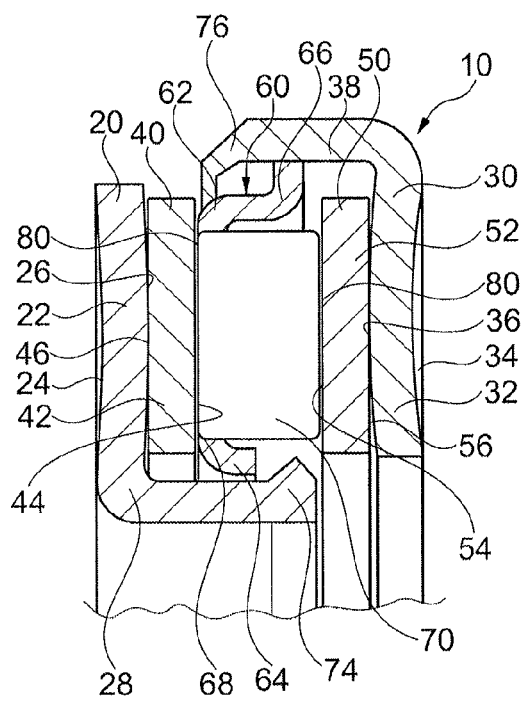
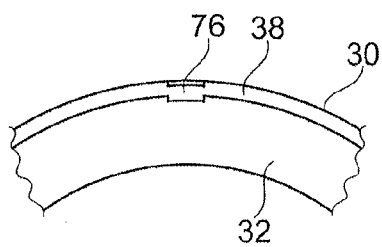
Fig. 3
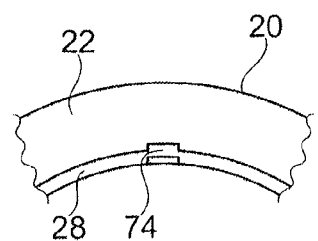
Fig. 4
Fig. 1
Fig. 2

AXIAL NEEDLE ROLLER BEARING WITH SELF-ALIGNING WASHERS

FIELD OF INVENTION

This application is generally related to rolling bearings and more particularly, to axial rolling bearing arrangements to improve axial load ratings and speed capability.

BACKGROUND

In some applications, axial needle roller bearings are provided with races having a convex rolling element contact surface in cross section, such as shown in U.S. Pat. No. 5,975,763. This design allows the races to deform with increasing load so that the contact between the needle rollers and the races is proportional to the applied load, allowing the load bearing capacity of the bearing to proportionately increase under an applied load. This arrangement is indicated as increasing bearing life and is said to reduce noise and optimize efficiency under variable load conditions. However, it has been found that this arrangement can be noisy under light loads. Further, the profiled raceways create high contact pressures due to the reduced contact area, which results in poor formation of the lubrication film.

In certain applications, such as torque converter axial bearings, the load is not applied at a constant radial position due to expansion of the torque converter, resulting in the axial load contact position shifting radially outwardly on the bearing ring, which places a higher axial load on radially outer regions of the needle rollers which can, in effect, pinch the rollers at their outer ends. This also can result in higher noise, due to the races contacting the chamfered or rounded end edges of the rollers which are not entirely uniform, depending on the manufacturing process. Using flat washers as the raceways also does not necessarily reduce edge loading in these conditions.

It would therefore be desirable to provide an axial needle roller bearing with which is an improvement over the drawbacks of the known prior art.

SUMMARY

In one embodiment, an axial needle roller bearing assembly is provided having a first axial end washer including a first radial body with a concave outer profile and a convex inner profile in radial cross-section, and a first axial flange on one of a radially inner or outer side. A second axial end washer is provided including a second radial body with a concave outer profile and a convex inner profile in radial cross-section, and a second axial flange extends from second radial body on the other of the radially inner or outer side from the first axial flange, with the first and second axial flanges extending in an axial direction toward one another. A first intermediate washer is provided which includes a first intermediate radial body with first and second axial sides, the first axial side defining a first bearing race and the second axial side defining a contact surface against the first axial end washer, where it contacts the convex inner profile. A second intermediate washer is provided which includes a second intermediate radial body with first and second axial sides, the first axial side defining a second bearing race and the second axial side defining a contact surface against the second axial end washer, where it contacts the convex inner profile. A cage and roller assembly is located between the first and second bearing races, and includes a cage with a plurality of radially extending needle roller pockets. Needle rollers are received in at least some of the pockets and roll against the first and second bearing races.

In one aspect, the cage further comprises a radially inner flange and a radially outer flange. The first axial flange at least partly engages behind one of the radially inner flange or the radially outer flange, and the second axial flange at least partly engages behind the other of the radially inner flange or the radially outer flange to retain the axial needle roller bearing together as a preassembled unit. Preferably, the first and second axial flanges each include retention tabs that engage behind the radially inner and outer flanges of the cage.

The cage is made from a metallic or polymeric material. The first axial end washer, the second axial end washer, the first intermediate washer, and the second intermediate washer are each preferably formed as a stamped sheet metal part, preferably from bearing grade steel, and are then hardened, tempered and surface treated.

In one aspect, the load carrying capacity of the bearing assembly is adjustable via elastic deformation of one or both of the concave profiles of the first and second axial end washers proportional to an axial load applied to the bearing assembly. However, regardless of the load, the first and second bearing races remain parallel and generally in linear contact with the needle rollers. A lubricant film is preferably located between the first and second bearing races and the needle rollers substantially along an entire axial extent of each of the needle rollers themselves (along the radial extent of the bearing), which increases bearing life and reduces wear. This is in contrast to the prior art convex races where the lubricant film is difficult to maintain due to the point contact between the needle rollers and the convex race surfaces at lower loads.

Additional preferred arrangements of the bearing assembly having one or more features of the invention are described below and in the claims.

BRIEF DESCRIPTION OF THE DRAWINGS

The foregoing Summary as well as the following Detailed Description will be best understood when read in conjunction with the appended drawings. In the drawings:

FIG. 1 is a plan view of an axial needle roller bearing according to one embodiment.

FIG. 2 is a cross-sectional view taken a long line 2-2 in FIG. 1.

FIG. 3 is a partial detailed view of one of the axial end washers showing a retention tab formed in the axial flange.

FIG. 4 is a partial view of the other axial end washer showing a retention tab formed in the axial flange.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Referring to the FIGS. 1 and 2, an axial needle roller bearing assembly 10 is shown. The axial needle roller bearing assembly 10 ("bearing assembly 10") includes a first axial end washer 20 having a first radial body 22 with a concave outer profile 24 and a convex inner profile 26 in radial cross-section. This profile is constant in a circumferential direction. A first axial flange 28 extends on one of a radially inner or outer side and in the embodiment shown extends from the radially inner side of the first axial end washer 20. A second axial end washer 30 is provided having a second radial body 32 with a concave outer profile and a convex inner profile 36 in radial cross-section. This profile is also constant in the circumferential direction. A second axial flange 38 extends from the second radial body on the other of the radially inner or outer side from the first axial flange 28, and in the embodiment illustrated, extends from the radially outer side. The first and second axial flanges 28, 38 extend in an axial direction toward one another as shown.

Still with references to FIGS. 1 and 2, a first intermediate washer 40 having a first intermediate radial body 42 with first and second axial sides 44, 46 is shown, with the first axial side 44 defining a first bearing race and the second axial side 46 defining a contact surface against the first axial end washer 20. A second intermediate washer 50 includes a second intermediate radial body 52 with first and second axial sides 54, 56. The first axial side 54 of the second intermediate washer 50 defines a second bearing race and the second axial side 56 of the second intermediate washer 50 defines a contact surface against the second axial end washer 30.

A cage 62 and rollers 70 located between the first and second bearing races formed by the first and second intermediate washers 40, 50. These are preferably in a cage and roller assembly 60 that is preassembled and includes the cage 62, preferably stamped from sheet metal, with pockets 68. The roller 70 are located in at least some of the pockets 68 and roll against the first and second bearing races provided on the first and second intermediate washers 40, 50. The cage 62 preferably includes a radially inner flange 64 and a radially outer flange 66, as shown in FIG. 2. The first axial flange 28 of the first axial end washer 20 at least partially engages behind one of the radially inner flange 64 or radially outer flange 66, and in the illustrated embodiment, behind the radially inner flange 64. The second axial flange 38 of the second axial end washer 30 at least partially engages behind the other of the radially inner flange 64 or the radially outer flange 66 of the cage 62, and in the illustrated embodiment, behind the radially outer flange 66, in order to retain the bearing assembly 10 as a preassembled unit.

As shown in detail in FIGS. 3 and 4, preferably, the first and second axial flanges 28, 38, each include retention tabs 74, 76 that engage behind the radially inner and outer flange 64, 66 of the cage 62. These retention tabs 74, 76 can be punched or otherwise formed in the radially inner and outer flanges 28, 38 of the first and second axial end washers 20, 30. For pre-assembling the bearing assembly 10, the retention tabs 74, 76 snap behind the radially inner and outer flange 64, 66 of the cage 62. While four tabs 74, 76 are illustrated on each of the radially inner and outer flange 64, 66, this number can be varied.

Preferably the first and second end washers 20, 30, as well as the first and second intermediate washers 40, 50 are punched or stamped from a bearing grade sheet metal, and then are de-burred or subjected to other surface treatment prior to being hardened and tempered. The cage 62 is preferably also stamped from the sheet metal but can also be formed from a polymeric material, if desired. The needle rollers 70 are preferably formed from hardened and tempered bearing grade steel.

As indicated at 80 in FIG. 2, a lubricant film is located between the first and second bearing races provided by the first and second intermediate washers 40, 50 and the needle rollers 70 substantially along an entire radial extent of each of the needle rollers 70. Since the first and second races provided by the first axial sides 44, 54 of the first and second intermediate washers 40, 50 respectively are flat, this allows complete linear contact of the rollers 70 with the first and second races, in contrast to the prior art bearings which include convex contact surfaces as the races which contact the rollers in order to provide a load bearing capacity of the bearing that increases proportionately to the applied load due to deflection and straightening out of the convex races in the prior art arrangements. In the present case, load bearing capacity of the bearing assembly 10 is adjustable by elastic deformation of the concave outer profiles 24, 34 of the first and second axial end washers 20, 30 straightening out under an applied axial load proportional to the load. However, the intermediate washers 40, 50 maintain a flat contact surface substantially along the entire extent of the rollers 70 in all load cases so that the lubricant film 80 can generally remain fully developed. Further, in certain applications, such as torque converters in which a conical back up condition occurs i.e., the load shifts radially outwardly as the torque converter itself expands under operating conditions, edge contacts by the associated race with only one radial end of the rollers 70 is avoided due to the intermediate washers 40, 50. This reduces noise generation which occurred in the prior art bearings due to this type of loading. The present arrangement also reduces high contact stresses due to the rollers 70 being subjected to a high load at only one radial end rather than having the applied axial load distributed across an entire radial extent of each of the needle rollers 70 and the bearing assembly 10.

Having thus described various embodiments of the present axial needle roller bearing assembly 10 in detail, it is to be appreciated and will be apparent to those skilled in the art that many physical changes, only a few of which are exemplified in the detailed description above, could be made in the assembly without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An axial needle roller bearing assembly, comprising:
   a first axial end washer having a first radial body with a concave outer profile and a convex inner profile in radial cross-section, and a first axial flange on one of a radially inner or outer side;
   a second axial end washer having a second radial body with a concave outer profile and a convex inner profile in radial cross-section, and a second axial flange extends from the second radial body on the other of the radially inner or outer side from the first axial flange, and the first and second axial flanges extending in an axial direction toward one another;
   a first intermediate washer having a first intermediate radial body with a first axial side and a second axial side, the first axial side defining a first bearing race and the second axial side defining a flat surface in contact with the first axial end washer;
   a second intermediate washer having a second intermediate radial body with a first axial side and a second axial side, the first axial side defining a second bearing race and the second axial side defining a flat surface in contact with the second axial end washer; and a cage with a plurality of radially extending needle roller pockets, and rollers received in at least some of the pockets that roll against the first and second bearing races.

2. The axial needle roller bearing of claim 1, wherein the cage further comprises a radially inner flange and a radially outer flange, the first axial flange at least partly engaging behind one of the radially inner flange or the radially outer flange, and the second axial flange at least partly engaging behind the other of the radially inner flange or the radially outer flange to retain the axial needle roller bearing together as a preassembled unit.

3. The axial needle roller bearing assembly of claim 2, wherein the first and second axial flanges each include retention tabs that engage behind the radially inner and outer flanges of the cage.

4. The axial needle roller bearing assembly of claim 1, wherein the cage is made from a metallic or polymeric material.

5. The axial needle roller bearing assembly of claim 1, wherein the first axial end washer, the second axial end washer, the first intermediate washer, and the second intermediate washer are each formed as a stamped sheet metal part.

6. The axial needle roller bearing of claim 1, wherein the load carrying capacity of the bearing assembly is adjustable via elastic deformation of the concave profiles of the first and second axial end washers proportional to an axial load applied to the bearing assembly.

7. The axial needle roller bearing of claim 1, wherein a lubricant film is located between the first bearing race, the second bearing race, and the needle rollers, substantially along an entire radial extent of each of the needle rollers.

8. An axial needle roller bearing assembly, comprising:

a first axial end washer having a first radial body with a concave outer profile and a convex inner profile in radial cross-section, and a first axial flange on one of a radially inner or outer side;

a second axial end washer having a second radial body with a concave outer profile and a convex inner profile in radial cross-section, and a second axial flange extending from the second radial body on the other of the radially inner or outer side from the first axial flange, and the first and second axial flanges extending in an axial direction toward one another;

a first intermediate washer having a first intermediate radial body with a first axial side and a second axial side, the first axial side defining a first bearing race and the second axial side defining a contact surface against the first axial end washer;

a second intermediate washer having a second intermediate radial body with a first axial side and a second axial side, the first axial side defining a second bearing race and the second axial side defining a contact surface against the second axial end washer; and a preassembled assembly located between the first and second bearing races, including a cage with a plurality of radially extending needle roller pockets, and rollers received in at least some of the pockets that roll against the first and second bearing races.

* * * * *